(12) United States Patent
Besch et al.

(10) Patent No.: US 11,488,151 B2
(45) Date of Patent: Nov. 1, 2022

(54) METHODS AND DEVICES FOR CONDUCTING PAYMENT TRANSACTIONS

(71) Applicant: GIESECKE & DEVRIENT GMBH, Munich (DE)

(72) Inventors: Matthias Besch, Munich (DE); Xiaomin Li, Beijing (CN); Xiaodong Zhang, Beijing (CN)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 577 days.

(21) Appl. No.: 15/316,984

(22) PCT Filed: Jun. 12, 2015

(86) PCT No.: PCT/EP2015/001205
§ 371 (c)(1),
(2) Date: Dec. 7, 2016

(87) PCT Pub. No.: WO2015/188949
PCT Pub. Date: Dec. 17, 2015

(65) Prior Publication Data
US 2017/0109740 A1 Apr. 20, 2017

(30) Foreign Application Priority Data
Jun. 13, 2014 (CN) .......................... 201410264718.1

(51) Int. Cl.
*G06Q 20/38* (2012.01)
*G06Q 20/32* (2012.01)
*G06Q 20/10* (2012.01)

(52) U.S. Cl.
CPC ....... *G06Q 20/3821* (2013.01); *G06Q 20/102* (2013.01); *G06Q 20/322* (2013.01);
(Continued)

(58) Field of Classification Search
CPC ............. G06Q 20/3274; G06Q 20/327; G06Q 20/405; G06Q 30/0207; H04W 8/245
(Continued)

(56) References Cited

U.S. PATENT DOCUMENTS

2005/0172137 A1* 8/2005 Hopkins ................ G06Q 20/02
713/185
2009/0030845 A1* 1/2009 Hurry ................ G06Q 20/3829
705/50
(Continued)

FOREIGN PATENT DOCUMENTS

CN           1941009 A      4/2007
CN         103020825 A      4/2013
(Continued)

OTHER PUBLICATIONS

Chinese Office Action for corresponding Chinese Application No. 201410264718.1, dated Aug. 23, 2016.
(Continued)

*Primary Examiner* — Saba Dagnew
(74) *Attorney, Agent, or Firm* — Workman Nydegger

(57) ABSTRACT

Methods and devices for of conducting a payment transaction between a mobile terminal and a payment terminal in communication with a payment backend system involve: (a) sending a unique mobile terminal identifier from the mobile terminal to the payment backend system; (b) returning a cryptogram from the payment backend system to the mobile terminal, wherein the cryptogram comprises a unique transaction identifier in encrypted form; (c) transforming the cryptogram into a proximity payment token such that the proximity payment token contains the unique transaction identifier in encrypted form and transmitting the proximity payment token to the payment terminal via a proximity communication channel; (d) forwarding a transaction record including the unique transaction identifier in encrypted form (Continued)

and the amount of the payment transaction from the payment terminal to the payment backend system; and (e) decrypting the unique transaction data identifier in encrypted form and processing the payment transaction.

16 Claims, 3 Drawing Sheets

(52) U.S. Cl.
CPC ....... G06Q 20/327 (2013.01); G06Q 20/3274 (2013.01); G06Q 20/3278 (2013.01); G06Q 20/385 (2013.01); G06Q 2220/00 (2013.01)

(58) Field of Classification Search
USPC ........................................ 705/41, 72, 79, 39
See application file for complete search history.

(56) References Cited

U.S. PATENT DOCUMENTS

| | | | |
|---|---|---|---|
| 2010/0318468 A1* | 12/2010 | Carr | G06Q 20/027 705/79 |
| 2012/0203696 A1* | 8/2012 | Morgan | G06Q 30/0207 705/44 |
| 2012/0316992 A1 | 12/2012 | Oborne | |
| 2013/0246258 A1* | 9/2013 | Dessert | G06Q 20/40 705/41 |
| 2013/0262317 A1* | 10/2013 | Collinge | G06Q 20/405 705/72 |
| 2014/0089205 A1* | 3/2014 | Kapur | G06Q 20/40 705/72 |
| 2014/0310182 A1* | 10/2014 | Cummins | G06Q 20/3274 705/72 |
| 2015/0056955 A1* | 2/2015 | Seleznyov | H04W 12/069 455/411 |
| 2015/0088674 A1* | 3/2015 | Flurscheim | G06Q 20/326 705/17 |
| 2015/0310417 A1* | 10/2015 | Syed | G06Q 20/322 705/39 |

FOREIGN PATENT DOCUMENTS

| | | |
|---|---|---|
| CN | 103765454 A | 4/2014 |
| CN | 103824186 A | 5/2014 |
| WO | 2009112793 A1 | 9/2009 |

OTHER PUBLICATIONS

International Search Report for corresponding International PCT Application No. PCT/EP2015/001205, dated Aug. 17, 2015.

* cited by examiner

METHODS AND DEVICES FOR CONDUCTING PAYMENT TRANSACTIONS

FIELD OF THE INVENTION

The invention relates to methods and devices for conducting a proximity closed-loop payment transaction between either two smart phones (peer-to-peer) or a smart phone and a merchant payment terminal.

BACKGROUND OF THE INVENTION

Credit cards, debit cards or white-label payment cards have been used by consumers for a long time as a convenient way to conduct payment transactions. Lately, digital wallets (also known as "e-wallets" or "e-credit card") and other electronic-based personal payment systems have emerged that allow users to conduct payment transactions without the necessity of physical cards or other standard payment mediums. Digital wallets are typically embodied as software and associated hardware in form of a mobile terminal, e.g., a mobile phone, personal digital assistant, a tablet computer, etc., on which the user's account information is maintained. Some digital wallets may aggregate multiple financial accounts of the user thereby allowing the user to carry a single electronic device while having access to the multiple financial accounts. A digital wallet may be used to complete transactions with a point-of-sale (POS) terminal of a merchant or as a peer-to-peer transaction between two smart phones. Typically, such devices communicate with each other through proximity communication channels, such as NFC, Bluetooth, ultrasound or optical signals.

Existing approaches such as TSM-based or HCE-based NFC payment are built on personalized virtual (or soft) cards and require large investments for setting up complex infrastructures and ensuring payment security. Alternative card-less proximity methods introduced by merchant service providers are considered convenient but unsecure.

There is a need for complementing card-based payment methods by means of alternative proximity channels while retaining security to an acceptable level.

SUMMARY OF THE INVENTION

The above need is addressed by the subject-matter of the independent claims according to the present invention. Preferred embodiments of the invention are defined in the dependent claims.

According to a first aspect the invention is directed to a method of conducting a payment transaction between a mobile terminal, preferably a smart phone, and a payment terminal in communication with a payment backend system, wherein the method comprises the following steps: (a) sending a unique mobile terminal identifier from the mobile terminal to the payment backend system; (b) returning a cryptogram from the payment backend system to the mobile terminal, wherein the cryptogram comprises a unique transaction identifier in encrypted form; (c) transforming the cryptogram into a proximity payment token such that the proximity payment token contains the unique transaction identifier in encrypted form and transmitting the proximity payment token to the payment terminal via a proximity communication channel; (d) forwarding a transaction record including the unique transaction identifier in encrypted form and the amount of the payment transaction from the payment terminal to the payment backend system; and (e) decrypting the unique transaction data identifier in encrypted form and processing the payment transaction by the payment backend system.

Preferably, after step (e) the method comprises the additional step of (f) sending a confirmation message to the mobile terminal and/or the payment terminal confirming that the payment transaction has been processed by the payment backend system.

According to preferred embodiments of the invention the mobile terminal identifier sent from the mobile terminal to the payment backend system in step (a) comprises a unique ID number, an international mobile subscriber identity (IMSI) of a secure element of the mobile terminal, an integrated circuit card identifier (ICCID) of the mobile terminal and/or its secure element and/or an international mobile equipment identity (IMEI) of the mobile terminal.

Preferably, the mobile terminal is a mobile phone that can communicate with the payment backend system via a mobile cellular communications network and/or a WiFi network.

According to preferred embodiments of the present invention the proximity token is a 2D bar code, preferably a QR code, a NFC message, a sound message and/or a Bluetooth message.

Preferably, the proximity token depends on the proximity communication channel between the mobile terminal and the payment terminal and wherein the proximity communication channel can be selected by the mobile terminal or is negotiated between the mobile terminal and the payment terminal.

According to preferred embodiments of the present invention the method comprises the additional step of requesting a payment confirmation from the mobile terminal.

Preferably, the proximity communication channel between the mobile terminal and the payment terminal is a bidirectional communication channel and wherein the request of a payment confirmation from the mobile terminal is sent from the payment terminal to the mobile terminal.

Alternatively, the proximity communication channel between the mobile terminal and the payment terminal is a unidirectional communication channel and wherein the request of a payment confirmation from the mobile terminal is sent from the payment backend system to the mobile terminal.

According to preferred embodiments of the present invention the transaction identifier is a one-time transaction identifier.

Preferably, the cryptogram comprises a validation period defining a time span within which the payment transaction can be conducted.

According to a second aspect the invention provides for a mobile terminal configured to be used in a method according to the first aspect of the invention.

The mobile terminal according to the present invention comprises means for communicating with a cellular communications network. Preferably, the mobile terminal is implemented in form of a mobile phone, a smart phone, a tablet PC, a notebook, a PDA, or the like.

According to a third aspect the invention provides for a payment terminal configured to be used in a method according to the first aspect of the invention.

According to a fourth aspect the invention provides for a payment backend system configured to be used in a method according to the first aspect of the invention.

According to a fifth aspect the invention provides for a communication system for conducting a payment transaction comprising a mobile terminal according to the second aspect of the invention, a payment terminal according to the third aspect of the invention and a payment backend system according to the fourth aspect of the invention.

These and other features, characteristics, advantages, and objects of the invention will be clear from the following detailed description of preferred embodiments, given as a non-restrictive example, under reference to the attached drawings. The person skilled in the art will appreciate, in particular, that the above preferred embodiments can be combined in several ways, which will result in additional advantageous embodiments that are explicitly supported and covered by the present invention. In particular, the person skilled in the art will appreciate that the above described preferred embodiments can be implemented in the context of the different aspects of the invention.

DETAILED DESCRIPTION OF PREFERRED EMBODIMENTS

Figure 1:
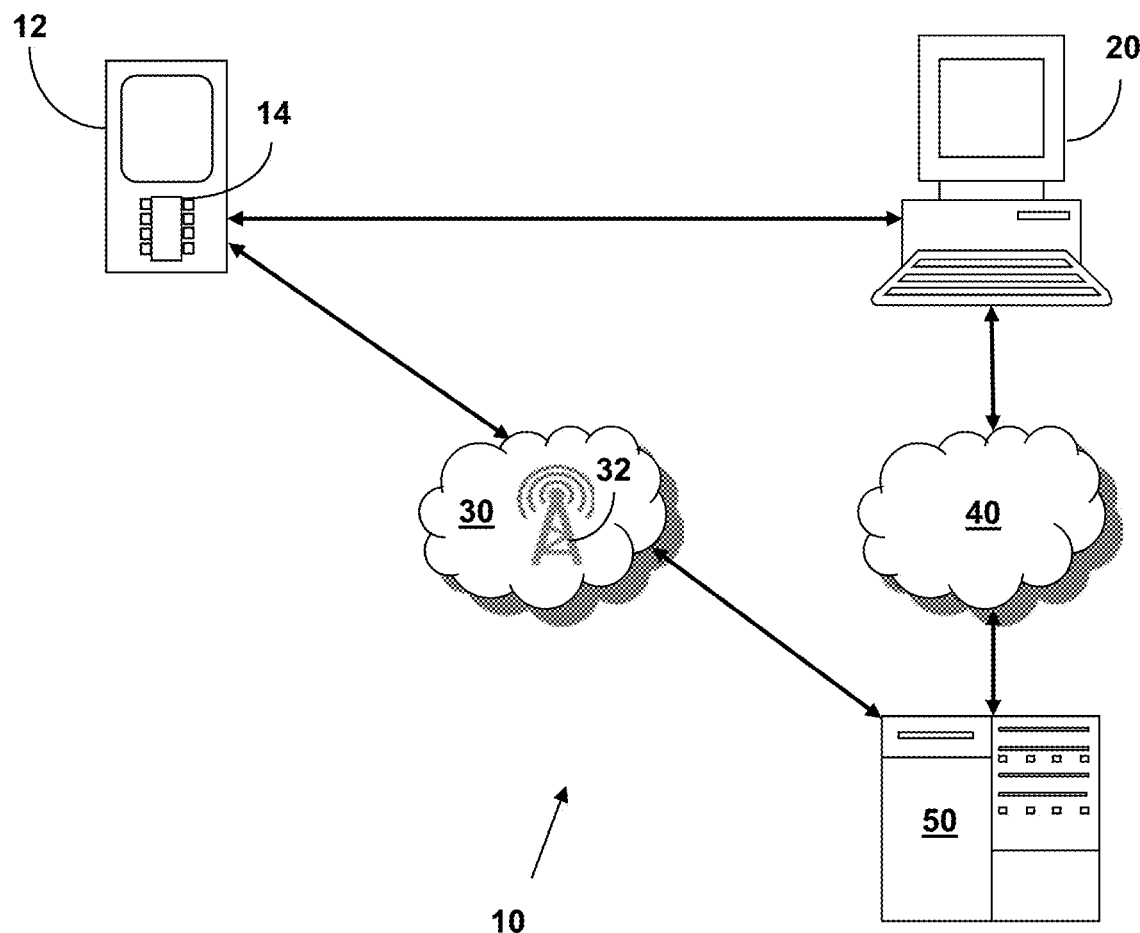
FIG. 1 shows a schematic overview of a communications system illustrating different aspects of the present invention.

FIG. 1 shows schematically the components of a communications system 10 as well as some of the communication channels or links between the components of this system 10 that illustrate several aspects of the present invention.

A mobile terminal 12, preferably a mobile phone, is configured to communicate with a payment terminal 20 of a merchant in order to conduct a payment transaction via the payment terminal 20. Preferably, the payment terminal 20 is configured as a POS terminal. Alternatively, the payment terminal 20 could be implemented by means of a mobile phone itself that is configured to operate as a payment terminal. According to the present invention, the mobile terminal 12 and the payment terminal 20 can communicate via different communication channels, such as NFC, RFID, Bluetooth, ZigBee, ultrasdound, optical and the like, as will be explained in more detail further below.

Moreover, the mobile terminal 12 is configured to communicate with a payment backend system 50, preferably via a mobile cellular communications network 30 (also referred to as public land mobile network (PLMN) 30), preferably operated by a mobile network operator (MNO) according to the GSM standard. In the following, preferred embodiments of the invention will be described in the context of a mobile cellular communications network according to the standards of the Global System for Mobile communication (GSM), as specified in a number of specifications provided by ETSI. However, the person skilled in the art will appreciate that the present invention may be advantageously applied in connection with other mobile cellular communications systems as well. Such systems include third-generation cellular communications systems (3GPP), such as the Universal Mobile Telecommunications System (UMTS), and next generation or fourth-generation mobile networks (4G), such as Long Term Evolution (LTE), as well as other cellular communications systems.

As is well known to the person skilled in the art, a PLMN configured according to the GSM standard generally comprises a base station subsystem consisting of one or more base transceiver stations that define respective cells of the PLMN and are connected to a base station controller. Generally, the base station controller is one of several base station controllers that communicate with a common mobile switching center (MSC). Often, a local database called Visitor Location Register (VLR) for keeping track of the mobile users currently located within the cells covered by a MSC (i.e. the MSC service area) is incorporated in the MSC. The MSC provides essentially the same functionality as a central office switch in a public-switched telephone network and is additionally responsible for call processing, mobility management, and radio resource management. The MSC is further in communication with a home location register (HLR), which is the primary database of the PLMN that stores information about its mobile users required for authentication. To this end, the HLR generally is in communication with an authentication center (AUC). The person skilled in the art will appreciate that although the above described components of a conventional GSM system may have different names in different or consecutive standards for mobile communications networks, the underlying principles used therein are substantially similar and, therefore, compatible with the present invention. Of the above described components of the PLMN 30 only an exemplary base transceiver station 32 is shown in the schematic drawing of FIG. 1 for ease of explanation.

A first preferred embodiment of a method of conducting a payment transaction using the mobile terminal 12, the payment terminal 20 and the payment backend system 50 will now be described under further reference to FIG. 2.

Figure 2:
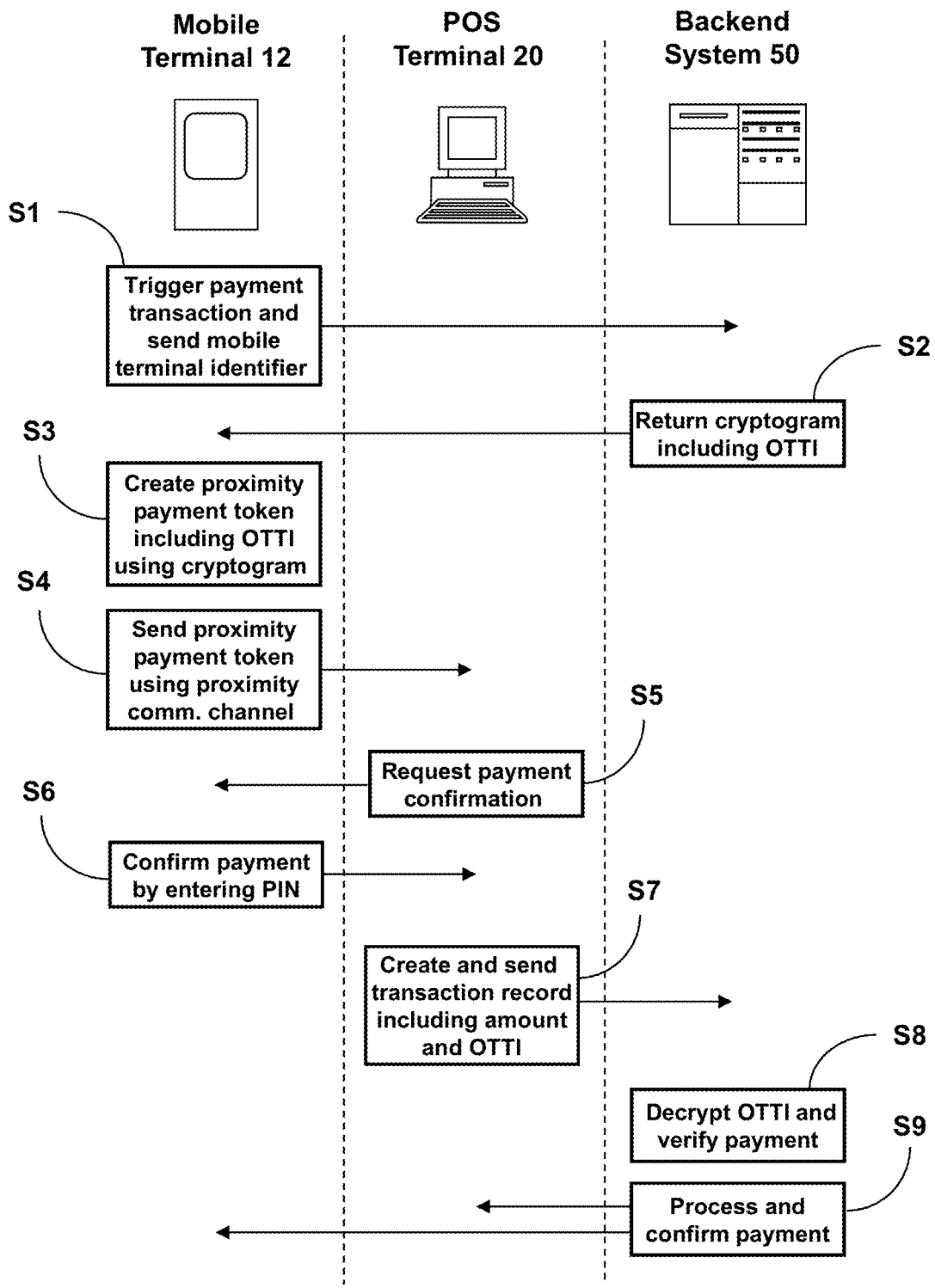
FIG. 2 shows a diagram illustrating a method for conducting a payment transaction by a mobile terminal within the communications system of FIG. 1 according to a first preferred embodiment of the invention.

In step S1 of FIG. 2 the mobile terminal 12 sends a message to the payment backend system 50 for informing the payment backend system 50 that the mobile terminal 12 (or rather its user) wants to conduct a payment transaction using the mobile terminal 12. This message, which could be triggered by the user opening a payment application on the mobile terminal 12, includes a mobile terminal identifier that allows the payment backend system 50 to uniquely identify the mobile terminal 12 and its user. The mobile terminal identifier can be a unique ID number, the IMSI of subscriptions credentials stored on a secure element of the mobile terminal 12, the ICCID of the mobile terminal 12 and/or a secure element of the mobile terminal 12, the IMEI of the mobile terminal 12 or the like.

Having received the message sent by the mobile terminal 12 in step S1 of FIG. 2, the payment backend system 50 will check, whether it contains a registered account associated with the mobile terminal identifier provided by the mobile terminal 12. If this is the case the payment backend system 50 creates a cryptogram, i.e. a message encrypted with a cryptographic key by using an encryption algorithm, on the basis of the mobile terminal identifier provided by the mobile terminal 12. As the person skilled in the art is aware of numerous encryption algorithms that could be used according to the present invention for providing the cryptogram, such as symmetric or asymmetric encryption algorithms, these will not be described in greater detail herein. The cryptogram, which is returned preferably via the cellular communications network 30 to the mobile terminal 12 in step S2 of FIG. 2, includes a unique transaction identifier in encrypted form, preferably a one-time transaction identifier (referred to as OTTI in FIGS. 2 and 3). Moreover, the cryptogram can contain data defining a validation period such that a payment transaction can be conducted using the cryptogram within the validation period only, for instance within a time period of ten minutes, one hour, one day or the like.

In step S3 of FIG. 2 the mobile terminal 12 transforms the cryptogram into a proximity payment token. According to the invention, the form of the proximity payment token depends on the payment method, i.e. the communication channel between the mobile terminal 12 and the payment terminal 20, which are available and/or the user of the mobile terminal 12 and/or the payment terminal 20 has selected for conducting the payment transaction. Preferably, the proximity payment token can be implemented in form of an optical QR code, a sound message, a NFC message or a Bluetooth message. According to the invention it is conceivable that the payment method, i.e. the communication channel between the mobile terminal 12 and the payment terminal 20, is selected by the user of the mobile terminal 12 out of a list presented to him on a display of the mobile terminal 12. In case there is only one payment method, i.e. one communication channel between the mobile terminal 12 and the payment terminal 20, available, this communication channel can be chosen by the mobile terminal 12 automatically.

The selection of the communication channel between the mobile terminal 12 and the payment terminal 20 for conducting the payment transaction could be part of step S3 of FIG. 2 after the mobile terminal 12 has received the cryptogram from the payment backend system 50. Alternatively, the user could select the communication channel as part of step S1 of FIG. 2, i.e. when originally triggering the payment transaction, such as by opening a payment application on the mobile terminal 12. According to a further alternative of the invention, the communication channel for conducting the payment transaction could be negotiated between the mobile terminal 12 and the payment terminal 20.

For instance, in case the cryptogram including the one-time transaction identifier (OTTI) is transformed into a proximity payment token that is implemented in form of an optical QR code the mobile terminal 12 will display the optical QR code on its display, where it can be scanned by an optical reader of the payment terminal 20 for transferring the proximity payment token also including the one-time transaction identifier (OTTI) from the mobile terminal 12 to the payment terminal 20.

Having received the proximity payment token in step S4 of FIG. 2 the payment terminal 20 sends to the mobile terminal 12 a payment transaction information message containing information about the payment transaction to be processed, in particular, the amount of the payment transaction, and requests confirmation for processing the payment transaction (see step S5 of FIG. 2). For a bidirectional payment method, i.e. communication channel between the mobile terminal 12 and the payment terminal 20, the payment transaction information message is send preferably to the mobile terminal via the same communication channel that has been used for providing the proximity payment token to the payment terminal. In case of a unidirectional communication channel between the mobile terminal 12 and the payment terminal 20, such as in the case of an optical QR code displayed on the mobile terminal 12, the payment transaction information message can be send to the mobile terminal 12 via the payment backend system 50.

In step S6 of FIG. 2 the user confirms the processing of the payment transaction, preferably by entering a PIN. According to an alternative embodiment it is conceivable that, in case the user has already authenticated himself, for instance by entering a PIN and/or using a fingerprint sensor, when accessing the mobile terminal 12 and/or the payment application 16, the user can confirm the processing of the payment transaction by simply pressing a button on the display of the mobile terminal 12.

Having received the user's confirmation to process the payment transaction from the mobile terminal 12, the payment terminal 20 creates a transaction record to be sent to the payment backend system 50. The transaction record comprises the information contained in the proximity payment token provided to the payment terminal 20 in step S4 of FIG. 2 and, thus, originally contained in the cryptogram provided to the mobile terminal 12 in step S2 of FIG. 2. Thus, the transaction record contains, in particular, the one-time transaction identifier (OTTI) in encrypted form. Moreover, the transaction record contains the amount of the payment transaction to be processed. In step S7 of FIG. 2 the transaction record is send from the payment terminal 20 to the payment backend system 50 via a communications network 40 as shown in FIG. 1. Preferably, the communications network 40 is the Internet.

In step S8 of FIG. 2 the payment backend system 50 processes the transaction record provided by the payment terminal 20 via the communications network 40. This step of processing the transaction record comprises the step of decrypting the one-time transaction identifier (OTTI) contained in the transaction record. On the basis of the decrypted one-time transaction identifier (OTTI) the payment backend system 50 can verify the payment transaction, preferably by identifying the mobile terminal 12, i.e. its user, locating the corresponding account within the payment backend system and checking that the balance of the account of the user of the mobile terminal 12 allows to deduct the amount of the payment transaction therefrom.

After the payment backend system 50 has verified the payment transaction in step S8 of FIG. 2, the payment backend system 50 processes the payment transaction, in particular by deducting the amount of the payment transaction from the account of the user of the mobile terminal 12, and sends confirmation messages to the mobile terminal 12 and/or the payment terminal 20 in step S9 of FIG. 2.

An alternative preferred embodiment of a method of conducting a payment transaction using the mobile terminal 12, the payment terminal 20 and the payment backend system 50 will now be described under reference to FIG. 3. The main difference between the embodiments shown in FIGS. 2 and 3 is that in the embodiment of FIG. 2 the communication channel between the mobile terminal 12 and the payment terminal 20 is a bidirectional or duplex communication channel, whereas in the embodiment of FIG. 3 the communication channel between the mobile terminal 12 and the payment terminal 20 is a unidirectional or simplex communication channel from the mobile terminal 12 to the payment terminal 20.

Figure 3:
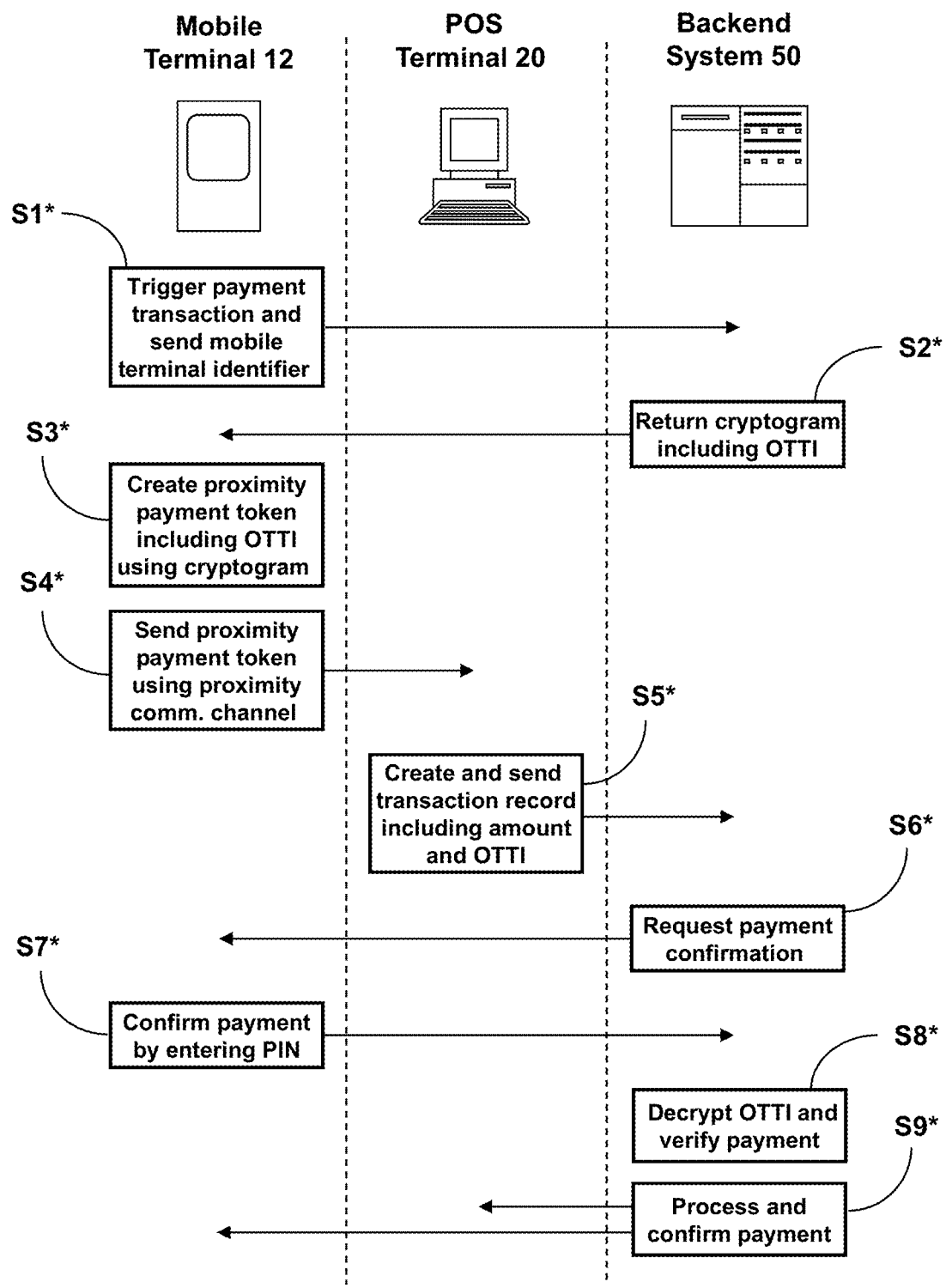
FIG. 3 shows a diagram illustrating a method for conducting a payment transaction by a mobile terminal within the communications system of FIG. 1 according to a second preferred embodiment of the invention.

As steps S1* to S4* of FIG. 3 are identical to steps S1 to S4 of FIG. 2 reference is made to the description above of steps S1 to S4 of FIG. 2 in order to avoid any unnecessary repetitions.

In step S5* of FIG. 3 the payment terminal 20 creates a transaction record to be sent to the payment backend system 50. The transaction record comprises the information contained in the proximity payment token provided to the payment terminal 20 in step S4* of FIG. 3 and, thus, originally contained in the cryptogram provided to the mobile terminal 12 in step S2* of FIG. 3. Thus, the transaction record contains, in particular, the one-time transaction identifier (OTTI) in encrypted form. Moreover, the transaction record contains the amount of the payment transaction to be processed. In step S5* of FIG. 3 the transaction record is send from the payment terminal 20 to the payment backend system 50 via the communications network 40, preferably the Internet.

Having received the transaction record in step S5* of FIG. 3 the payment backend system 50 sends to the mobile terminal 12 a payment transaction information message containing information about the payment transaction to be processed, in particular, the amount of the payment transaction, and requests confirmation for processing the payment transaction (see step S6* of FIG. 3).

In step S7* of FIG. 3 the user confirms the processing of the payment transaction, preferably by entering a PIN. Having received the user's confirmation, the payment backend system 50 in step S8* of FIG. 3 processes the transaction record provided by the payment terminal 20 via the communications network 40 in step S5* of FIG. 3. This step of processing the transaction record comprises the step of decrypting the one-time transaction identifier (OTTI) contained in the transaction record. On the basis of the decrypted one-time transaction identifier (OTTI) the payment backend system 50 can verify the payment transaction, preferably by identifying the mobile terminal 12, i.e. its user, locating the corresponding account within the payment backend system and checking that the balance of the account of the user of the mobile terminal 12 allows to deduct the amount of the payment transaction therefrom.

In certain inventive embodiments it could be necessary that the step of processing the one-time transaction identifier (OTTI), in particular decrypting the one-time transaction identifier (OTTI), is performed by the payment backend system 50 prior to the step S6* of requesting a payment confirmation from the mobile terminal 12. This could be the case, for instance, in embodiments where information about the identity of the mobile terminal 12, such as its IMSI, can only be retrieved by means of the decrypted one-time transaction identifier (OTTI).

After the payment backend system 50 has verified the payment transaction in step S8* of FIG. 3, the payment backend system 50 processes the payment transaction, in particular by deducting the amount of the payment transaction from the account of the user of the mobile terminal 12, and sends confirmation messages to the mobile terminal 12 and/or the payment terminal 20 in step S9* of FIG. 3.

On the basis of the above described two preferred embodiments of the present invention the person skilled in the art will readily appreciate that the content of the cryptogram is only readable by the payment backend system 50. There is no decryption occurring at the mobile terminal 12 or the payment terminal 20. Only the payment backend system 50 can decrypt the one-time transaction identifier (OTTI).

In light of the above detailed description the person skilled in the art will appreciate that modifications and/or additions can be made to the methods and devices as described heretofore, which are to be considered to remain within the scope of the present invention as defined by the appended claims.

The invention claimed is:

1. Method of conducting a payment transaction between a mobile terminal and a payment terminal in communication with a payment backend system, wherein the method comprises the following steps:
 (a) the mobile terminal initiating a transaction by sending a mobile terminal identifier directly from the mobile terminal to the payment backend system without an intermediary;
 (b) the payment backend system creating a cryptogram comprising a transaction identifier in encrypted form, the payment backend system sending the cryptogram directly to the mobile terminal;
 (c) the mobile terminal generating a proximity payment token using the cryptogram such that the proximity payment token contains the transaction identifier in encrypted form, and transmitting the proximity payment token to the payment terminal via a proximity communication channel;
 (d) the payment terminal creating a transaction record including the transaction identifier in encrypted form and an amount of the payment transaction, the payment terminal forwarding the transaction record to the payment backend system; and
 (e) the payment backend system decrypting the transaction identifier in encrypted form to verify the transaction and processing the payment transaction.

2. The method of claim 1, wherein after step (e) the method comprises the additional step of (f) sending a confirmation message to the mobile terminal and/or the payment terminal confirming that the payment transaction has been processed by the payment backend system.

3. The method of claim 1, wherein the mobile terminal identifier sent from the mobile terminal to the payment backend system in step (a) comprises an unique ID number, an international mobile subscriber identity (IMSI) of a secure element of the mobile terminal, an integrated circuit card identifier (ICCID) of the mobile terminals and/or a secure element of the mobile terminal and/or an international mobile equipment identity (IMEI) of the mobile terminal.

4. The method of claim 1, wherein the mobile terminal is a mobile phone that can communicate with the payment backend system via a mobile cellular communications network and/or a WiFi network.

5. The method of claim 1, wherein the proximity token is a 2D bar code, including a QR code, a NFC message, a sound message and/or a Bluetooth message.

6. The method of claim 1, wherein the proximity token depends on the proximity communication channel between the mobile terminal and the payment terminal and wherein the proximity communication channel can be selected by the mobile terminal and/or the payment terminal or is negotiated between the mobile terminal and the payment terminal.

7. The method of claim 1, wherein the method comprises the additional step of requesting a payment confirmation from the mobile terminal.

8. The method of claim 7, wherein the proximity communication channel between the mobile terminal and the payment terminal is a bidirectional communication channel and wherein the request of a payment confirmation from the mobile terminal is sent from the payment terminal to the mobile terminal.

9. The method of claim 7, wherein the proximity communication channel between the mobile terminal and the payment terminal is a unidirectional communication channel and wherein the request of a payment confirmation from the mobile terminal is sent from the payment backend system to the mobile terminal.

10. The method of claim 1, wherein the transaction identifier is a one-time transaction identifier.

11. The method of claim 1, wherein the cryptogram comprises a validation period defining a time span within which the payment transaction can be conducted.

12. A communication system for conducting a payment transaction, wherein the communication system comprises a mobile terminal, a payment terminal, and a payment backend system according to a method comprising the steps of:

(a) the mobile terminal initiating a transaction by sending a mobile terminal identifier directly from the mobile terminal to the payment backend system without an intermediary;

(b) the payment backend system creating a cryptogram comprising a transaction identifier in encrypted form, the payment backend system sending the cryptogram directly to the mobile terminal;

(c) the mobile terminal generating a proximity payment token using the cryptogram such that the proximity payment token contains the transaction identifier in encrypted form, and transmitting the proximity payment token to the payment terminal via a proximity communication channel;

(d) the payment terminal creating a transaction record including the transaction identifier in encrypted form and an amount of the payment transaction, the payment terminal forwarding the transaction record to the payment backend system; and (e) the payment backend system decrypting the transaction identifier in encrypted form to verify the transaction and processing the payment transaction.

13. The method of claim 1, wherein the cryptogram comprising a transaction identifier in encrypted form is sent sequentially from the payment backend system to the mobile terminal to the payment terminal and back to the payment backend system in encrypted form, such that the cryptogram is only decrypted in the payment backend system.

14. The method of claim 1, wherein the cryptogram comprising a transaction identifier in encrypted form is only readable by the payment backend system and only the payment backend system can decrypt the transaction identifier.

15. The method of claim 13, wherein the transaction identifier is a one-time transaction identifier, the one-time transaction identifier identifying a user of the mobile terminal and a corresponding account in the payment backend system.

16. Method of conducting a payment transaction between a mobile terminal and a payment terminal in communication with a payment backend system, wherein the method comprises the following steps:

(a) the mobile terminal initiating a transaction by sending a mobile terminal identifier directly to the payment backend system;

(b) the payment backend system creating a cryptogram comprising a transaction identifier in encrypted form, the payment backend system sending the cryptogram to the mobile terminal;

(c) the mobile terminal generating a proximity payment token using the cryptogram such that the proximity payment token contains the transaction identifier in encrypted form, and transmitting the proximity payment token to the payment terminal via a proximity communication channel;

(d) the payment terminal creating a transaction record and a payment transaction message, the transaction record including the transaction identifier in encrypted form and an amount of the payment transaction, the payment transaction message including the amount of the payment transaction, the payment terminal forwarding the transaction record to the payment backend system and forwarding the payment transaction message to the mobile terminal; and (e) the payment backend system decrypting the transaction identifier in encrypted form to verify the transaction and processing the payment transaction;

wherein prior to the payment terminal forwarding the transaction record to the payment backend system, the mobile terminal confirms the payment transaction message by transmitting a confirmation message to the payment terminal.

* * * * *